United States Patent
Park et al.

(10) Patent No.: US 8,731,623 B2
(45) Date of Patent: May 20, 2014

(54) METHOD OF PAGING

(75) Inventors: Gi Won Park, Anyang-si (KR); Ki Seon Ryu, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 845 days.

(21) Appl. No.: 12/991,371

(22) PCT Filed: May 8, 2009

(86) PCT No.: PCT/KR2009/002430
§ 371 (c)(1),
(2), (4) Date: Nov. 5, 2010

(87) PCT Pub. No.: WO2009/136759
PCT Pub. Date: Nov. 12, 2009

(65) Prior Publication Data
US 2011/0065467 A1    Mar. 17, 2011

Related U.S. Application Data

(60) Provisional application No. 61/051,357, filed on May 8, 2008.

(30) Foreign Application Priority Data

Jul. 11, 2008  (KR) ........................ 10-2008-0067501

(51) Int. Cl.
*H04B 1/38* (2006.01)

(52) U.S. Cl.
USPC .......................... 455/574; 455/456.1; 455/458

(58) Field of Classification Search
CPC ....... H04W 68/06; H04W 68/08; Y02B 60/50
USPC ....................... 455/458, 574, 456.1
See application file for complete search history.

(56) References Cited

U.S. PATENT DOCUMENTS

| 7,130,296 | B2 | 10/2006 | McNiff et al. | |
| 8,116,771 | B2* | 2/2012 | Comstock et al. | 455/436 |
| 2006/0014550 | A1* | 1/2006 | Ryu et al. | 455/458 |
| 2006/0089161 | A1* | 4/2006 | Kim et al. | 455/458 |
| 2006/0205429 | A1 | 9/2006 | Ryoo | |
| 2008/0119209 | A1* | 5/2008 | Upp | 455/458 |

* cited by examiner

*Primary Examiner* — Raymond Dean
(74) *Attorney, Agent, or Firm* — Birch, Stewart, Kolasch & Birch, LLP

(57) ABSTRACT

The present invention relates to a wireless access system, and more particularly, to a method of transmitting/receiving a paging message by minimizing power consumption of a mobile station. A method of performing paging for a mobile station in idle mode comprises receiving a deregistration command message including a paging cycle, a paging offset and a paging group identifier and if moving away into a different cell area, performing a location update with a target base station of the different cell area. Preferably, the location update is performed only if moving away into an initially different cell area but is not performed if moving into another different cell area.

10 Claims, 10 Drawing Sheets

FIG. 10
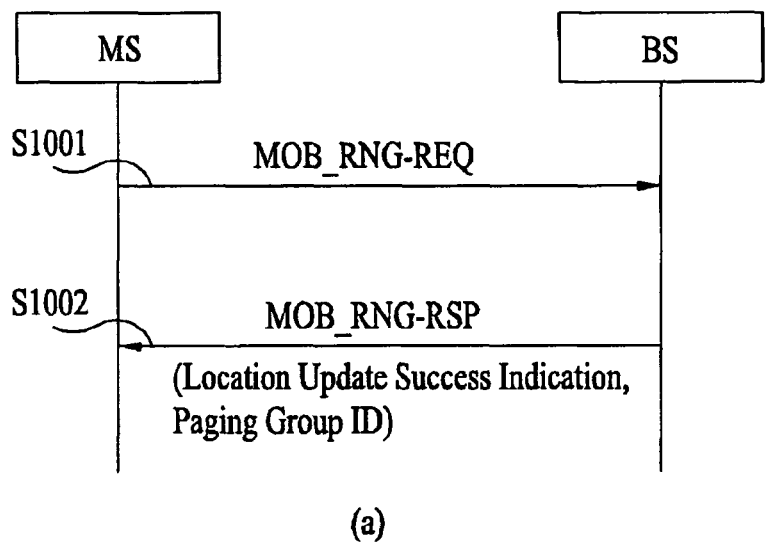
(a)
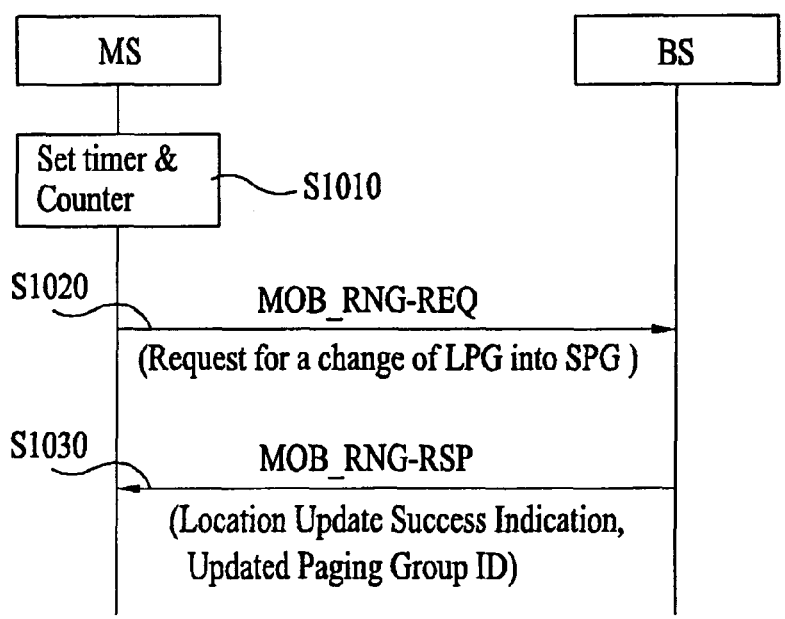
(b)

METHOD OF PAGING

This application is the National Phase of PCT/KR2009/002430 filed on May 8, 2009, which claims priority under 35 U.S.C. 119(e) to U.S. Provisional Application No. 61/051,357 filed on May 8, 2008, and under 35 U.S.C. 119(a) to Patent Application No. 10-2008-0067501 filed in Republic of Korea on Jul. 11, 2008, all of which are hereby expressly incorporated by reference into the present application.

TECHNICAL FIELD

The present invention relates to a wireless access system, and more particularly, to a method of transmitting/receiving a paging message by minimizing power consumption of a mobile station.

BACKGROUND ART

In the following description, a generally used paging group and an idle mode of a terminal are schematically explained.

FIG. 1 is a diagram for an example of a paging group consisting of a plurality of base stations.

First of all, paging means a function of obtaining a location (e.g., a prescribed base station, a prescribed switching station, etc.) of a mobile station (hereinafter abbreviated MS) corresponding to an occurrence of an incoming signal in mobile communication.

Referring to FIG. 1, a plurality of base stations (BS) supporting an idle mode may belong to a paging group to construct a paging area.

In this case, the paging group indicates a logical group. If there is a traffic that targets a mobile station (MS), the object of the paging group is to provide a neighbor range area that can be paged in downlink (DL). Preferably, the paging group should meet the condition to be large enough for a specific terminal to exist for most of time within a same paging group and the condition to be small enough for a paging load to maintain a proper level.

FIG. 1 shows four paging groups defined on multiple base stations located at hexagonal lattices. One base station is able to be included in one or more paging groups. The paging group is defined by a management system. And, a paging group is able to use a paging group-action backbone network message. Moreover, a list of terminal in idle mode is managed using a paging-announce message corresponding to one of backbone network messages and initial paging of all base stations belonging to a paging group can be managed.

Idle mode indicates an operation of supporting a terminal to periodically receive a downlink (DL) broadcast traffic transmission without registering at a specific base station when the terminal is moving in a wireless link environment constructed with multiple base stations.

Idle mode is able to give the benefit to a terminal by eliminating a handover-related activation requirement and general operation requirements. Idle mode is able to save power and operational resources used by a terminal in a manner of put limitation on a terminal action to be scanned in a discrete cycle.

Idle mode provides a simple and proper method of informing a terminal for a downlink traffic is pending and is able to give the benefit to a network and a base station by removing a wireless interface and a network handover (HO) traffic from an inactive terminal.

SUMMARY OF THE INVENTION

Generally, a paging group that covers one wide area for idle-mode terminals is used. If there is a call or packet to transmit to a mobile station, a paging controller should deliver a paging message to all base stations within a paging group to find a corresponding mobile station for the corresponding call or packet.

Moreover, every mobile station within a paging group should keep monitoring a radio channel for a paging listening interval to check whether there exists a paging message transmitted to the corresponding mobile station. Therefore, the mobile station may waste power unnecessarily.

Accordingly, the present invention is directed to a paging method that substantially obviates one or more of the problems due to limitations and disadvantages of the related art.

An object of the present invention is to provide an efficient paging method using an optimized power.

Another object of the present invention is to provide a method of efficiently transmitting a paging message to a mobile station in idle mode.

Still another object of the present invention is to provide a method of efficiently transmitting a paging message by optimizing an available power of a mobile station in idle mode.

A further object of the present invention is to provide a method of minimizing a total power used within a wireless system by newly defining a paging group.

A still further object of the present invention is to provide a method of reducing a location update overhead generated in case that a mobile station frequently changes paging groups.

The technical problem which is to be obviated by the present invention is not limited to the problems mentioned above. Moreover, other problems which are not mentioned above can be apparent to those skilled in the art from the description which follows.

In order to solve the above technical problems, the present invention discloses a method for efficiently paging in a wireless access system.

In one aspect of the present invention, a method of paging for a mobile station in idle mode comprises receiving a deregistration command message including a paging cycle, a paging offset and a paging group identifier and if moving away into a different cell area, performing a location update with a target base station of the different cell area, wherein the location update is performed only if moving away into an initially different cell area but is not performed if moving into another different cell area.

In another aspect of the present invention, a method of paging a mobile station in idle mode for a paging controller comprises receiving a message including information of the mobile station and information of a first base station, in case of performing an initial location update according to a movement into a second base station within a paging group of the mobile station, receiving a message including the mobile station information and information of the second base station, if the first base station information and the second base station information are matched, sending a paging message to the first base station, and if the first base station information and the second base station information are not matched, sending a paging message to all base stations within the paging group.

In still another aspect of the present invention, a method of paging for a mobile station in idle mode comprises receiving a message including a small paging group identifier and a large paging group identifier and if the mobile station moves away from the small paging group into at least one different small paging group at least once, performing a location update with a target base station within the at least one different small paging group, wherein the small paging group and the at least one different small paging group are included in the large paging group.

Preferably, the method further includes the step of if the mobile station enters the idle mode, setting a small paging group change timer.

More preferably, if the small paging group change timer expires, the location update is performed with a target base station of the small paging group the mobile station belongs to on the expiration of the timer.

More preferably, the method further includes the step of setting a small paging group change counter having a maximum threshold.

In this case, in the step of performing the location update, if the location update is performed as many as the maximum threshold, the mobile station is able to change a paging group into the large paging group. Therefore, the mobile station is able to reduce a location update signaling overhead.

Besides, the method further includes the step of making a request for a change into the large paging group from the small paging group the mobile station belongs to.

In a further aspect of the present invention, a method of paging a mobile station in idle mode for a paging controller comprises receiving a message including information of the mobile station and information of a serving base station within a small paging group, setting a small paging group counter having a prescribed threshold, and calculating a value of the small paging group counter each time the mobile station moves away into at least one different small paging group included in a large paging group.

Preferably, the method further includes the step of if the small paging group counter is set to 0, sending a paging message to the serving base station within the small paging group.

Preferably, the method further includes the step of if the value of the small paging group counter does not correspond to the prescribed threshold, sending a paging message to a small paging area in which the mobile station has performed a last location update.

Preferably, the method further includes the step of if the value of the small paging group counter corresponds to the prescribed threshold, sending a paging message to all base stations included within the large paging group.

Preferably, the method further includes the step of receiving a backbone message including information of a target base station belonging to a small paging group into which the mobile station has moved. Hence, the mobile station is able to calculate a value of the small paging group counter by receiving the backbone message.

Preferably, the method further includes the step of if the value of the small paging group counter corresponds to the prescribed threshold, sending a message for instructing a paging group change to the mobile station. Moreover, if the value of the small paging group counter corresponds to the prescribed threshold, a prescribed base station is able to indicate the mobile station to change the paging group.

In a still further aspect of the present invention, a method of paging for a mobile station in idle mode comprises receiving a message including information of the mobile station and information of a serving base station within a small paging group, if the mobile station moves away into at least one different small paging group, receiving a message including updated location information of the mobile station from each of the at least one small paging group, if the mobile station moves away into the at least one small paging group as many as a prescribed threshold, sending a paging message to all base stations belonging to a large paging group, and if the mobile station does not move away into the at least one small paging group as many as the prescribed threshold, sending the paging message to a prescribed small paging group according to the updated location information of the mobile station.

Preferably, the paging message sending step includes the steps of if the mobile station moves away into the at least one small paging group as many as the prescribed threshold, changing a paging group of the mobile station into the large paging group and sending a changed large paging group identifier to the mobile station to instruct to change the paging group of the mobile station.

It is to be understood that both the foregoing general description and the following detailed description are exemplary and explanatory and are intended to provide further explanation of the invention as claimed.

Accordingly, the present invention provides the following effects or advantages.

First of all, paging can be efficiently performed through embodiments of the present invention.

Secondly, it is able to effectively send a paging message to a mobile station in idle mode.

Thirdly, it is able to send a paging message by optimizing an available power of a mobile station in idle mode.

Fourthly, according to embodiments of the present invention, it is able to minimize a total power of a mobile station used within a wireless system by newly defining a paging group.

Fifthly, even if a mobile station frequently changes paging groups, a location update overhead of a mobile station can be effectively reduced by methods disclosed in embodiments of the present invention.

Additional features and advantages which are not mentioned above of the invention will be set forth in the description which follows, and will be apparent to those skilled in the art from the description, or may be learned by practice of the invention.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 10 is a diagram for a location updating method usable for embodiments of the present invention.

DETAILED DESCRIPTION OF THE INVENTION

Figure 1:
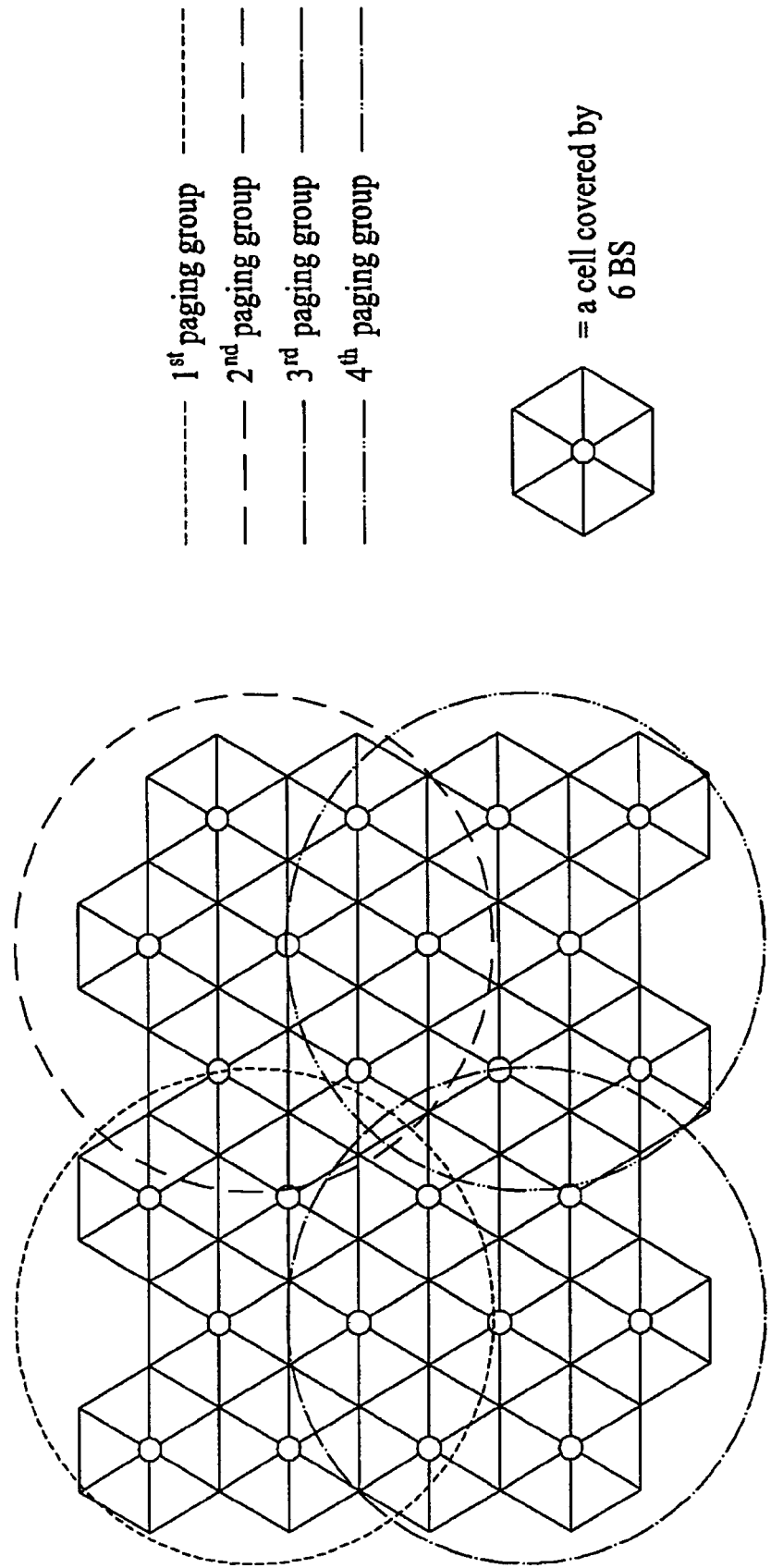
FIG. 1 is a diagram for an example of a paging group consisting of a plurality of base stations.

Reference will now be made in detail to the preferred embodiments of the present invention, examples of which are illustrated in the accompanying drawings.

The present invention relates to a wireless access system, and more particularly, to a method of transmitting/receiving a paging message by minimizing power consumption of a mobile station.

First of all, the following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In the description of the drawings, procedures, steps and/or the like are not described to avoid making the gist of the present invention unclear.

In this disclosure, embodiments of the present invention are described centering on the data transmission/reception relations between a base station and a terminal. In this case, the base station is meaningful as a terminal node of a network which directly performs communication with the terminal. In this disclosure, a specific operation explained as performed by a base station can be performed by an upper node of the base station in some cases.

In particular, in a network constructed with a plurality of network nodes including a base station, it is apparent that various operations performed for communication with a terminal can be performed by a base station or other networks except the base station. In this case, 'base station' can be replaced by such a terminology as a fixed station, a Node B, an eNode B (eNB), an access point and the like. And, 'terminal' can be replaced by such a terminology as a user equipment (UE), a mobile station (MS), a mobile subscriber station (MSS)' and the like.

Moreover, a transmitting side means a node configured to transmit a data or audio service and a receiving side means a node configured to receive the data or audio service. Therefore, in uplink, a terminal becomes a transmitting side and a base station can become a receiving side. On the contrary, in downlink, a terminal becomes a receiving side and a base station can become a transmitting side.

Besides, a mobile station of the present invention can include a PDA (personal digital assistant), a cellular phone, a PCS (personal communication service) phone, a GSM (global system for mobile) phone, a WCDMA (wideband CDMA) phone, an MBS (mobile broadband system) phone or the like.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

In the following description, specific terminologies are provided to help the understanding of the present invention. And, the use of the specific terminology can be modified into another form within the scope of the technical idea of the present invention.

Figure 2:
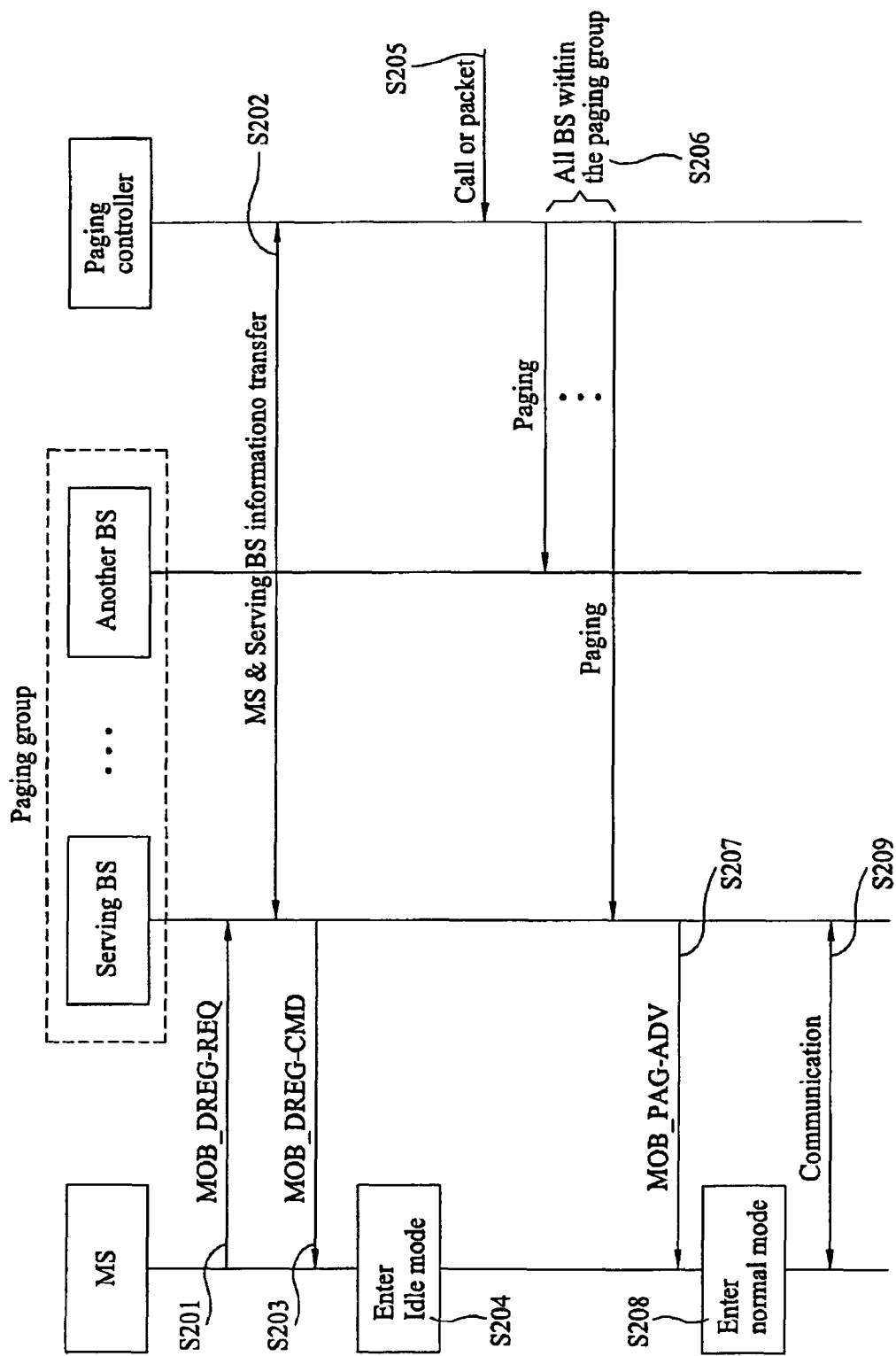
FIG. 2 is a diagram for a paging procedure in IEEE 802.16 system as a wireless access system.

FIG. 2 is a diagram for a paging procedure in IEEE 802.16 system as a wireless access system.

In idle mode, paging can be performed by a paging group unit. For instance, a mobile station can belong to at least one or more paging groups. In case that a call or a user packet toward a mobile station is incoming from an external network, a paging controller (hereinafter abbreviated PC) of each of the paging groups performs paging for searching for the corresponding mobile station. In doing so, the paging controller delivers a paging message to all base stations within the corresponding paging group. Each of the base stations having received the paging message then broadcasts a paging advertisement (MOB-PAG_ADV) message to the corresponding mobile station. Thus, the paging can be performed in this manner.

Referring to FIG. 2, a mobile station sends a deregistration request (MOB-DREG-REQ) message to a serving base station to enter an idle mode from a normal mode [S201].

Having received the deregistration request message, the serving base station is able to exchange mobile station information and serving base station information with a paging controller, namely, the serving base station is able to inform the paging controller of a mobile station identifier of the mobile station entering the idle mode and a serving base station identifier. And, the paging controller is able to inform the serving base station of a paging group identifier (PG ID) or a paging controller identifier (PC ID). In this case, the paging group identifier (PG ID) or the paging controller identifier (PC ID) is usable in transmitting/receiving a paging message [S202].

The serving base station is able to send a deregistration command (MOB_DREG-CMD) message to the mobile station in response to the deregistration request message. In this case, the deregistration command message can contain paging information (e.g., a paging cycle, a paging offset and a paging listening interval). And, the deregistration command message can further contain a paging controller identifier and a paging group identifier [S203].

Having checked the MOB_DREG-CMD message, the mobile station enters the idle mode. The mobile station is able to receive a paging message based on the paging information received via the MOB_DREG-CMD message. In particular, the mobile station is able to monitor a radio channel to check whether there is a paging message delivered to the mobile station for the paging listening interval. And, the mobile station operates in sleep mode or 'radio turn off' for the rest of time. Hence, the mobile station is able to reduce battery consumption [S204].

A call or packet may be inputted to the paging controller [S205].

In case of receiving a call or an external packet, the paging controller is able to perform a paging procedure. In this case, the paging controller delivers a paging message to all base stations within a paging group [S206].

Having received the paging message, all the base stations within the paging group broadcast MOB_PAG-ADV messages to all mobile stations managed by the base stations, respectively [S207].

The corresponding mobile station checks the MOB_PAG-ADV message. If the mobile station is paged by the paging controller, the mobile station enters a normal mode and is then able to perform communications with the serving base station [S208, S209].

Figure 3:
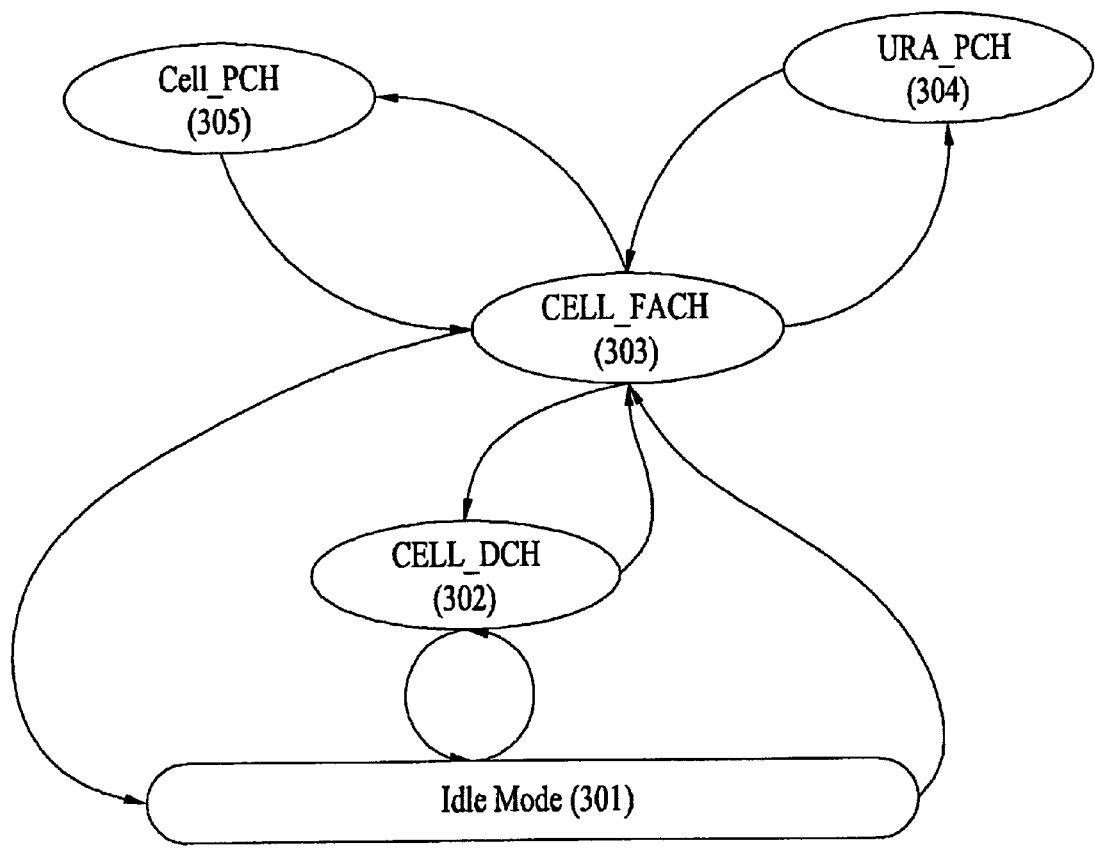
FIG. 3 is a diagram for states of a paging method of a mobile station in 3GPP system as one of wireless access systems.

FIG. 3 is a diagram for states of a paging method of a mobile station in 3GPP system as one of wireless access systems.

A paging method according to each state is explained in detail with reference to FIG. 3 as follows.

First of all, a radio resource control (RRC) protocol of a mobile station has five RRC states.

Referring to FIG. 3, a radio resource control protocol can include a state of a CELL_DCH (dedicated channel) 302 having an RRC connection established, a state of a CELL_FACH (forward access channel) 303, a state of a URA_PCH (URA physical channel) 304, a state of a CELL_PCH (physical channel) 305, and a state of an idle mode 301 having no RRC connection established.

Since an RRC connection is not established between a mobile station and a mobile station in the state of the idle mode 301, the base station is not aware of a presence of the mobile station. Namely, a radio network controller (hereinafter abbreviated RNC) managing various base stations is not aware of a location of the mobile station as well. Therefore, if the RNC needs to send a paging message to a corresponding mobile station, a paging message is broadcasted to a whole area managed by the RNC.

If the RRC connection is established between the mobile station and the base station, the mobile station enters the state of the CELL_DCH 302 or the CELL_FACH 303. If the mobile station has no data to send to the base station or fails to receive data from the base station for predetermined duration in the state 302 or 303, the mobile station is able to enter the state of the CELL_PCH 305 or the URA_PCH 304 to save a battery of mobile station.

After the mobile station in the state 304 or 305 has received the paging message transmitted by the RNC, it enters the state of the CELL_FACH 303 again to perform communication with the base station. In this case, the state of the CELL_PCH 305 differs from that of the URA_PCH 304 due to the following.

First of all, the mobile station in the state of the CELL_PCH 305 performs a location update by a cell unit. Yet, the mobile station in the state of the URA_PCH 304 is able to perform a location update by unit of URA (UTRAN registration area, a bundle of several cells). However, if there is no communication between the mobile station and the base station, the mobile station having low mobility enters the state of the CELL_PCH 304 from the CELL_FACH 303 and the mobile station having high mobility is able to enter the URA_PCH 304.

In the following description, embodiments for a mobile station to perform paging by minimizing power consumption are explained in detail.

1. Paging Method Using Location Update

When a mobile station in idle mode moves away into another cell, it is able to minimize power consumption of the mobile station by supporting an initial location update once only. In this case, the location update means a process for a paging controller (PC) to update a current location of a mobile station in an idle mode.

If a call or packet to be delivered to a mobile station from an external device or a paging controller occurs, the paging controller is able to compare a first base station identifier (e.g., a serving base station identifier) which was obtained at the time of an idle mode entry of the mobile station with a second base station identifier (e.g., a target base station identifier) which is currently posed by the paging controller.

If these two identifiers are matched, the paging controller is able to deliver a paging message to the second base station. This is because the matching of the two identifiers indicates that the mobile station has not moved away from a serving base station cell area at the time of the idle mode entry of the mobile station into a cell area of a target base station. Therefore, it is able to reduce battery consumption of the mobile station in a manner of removing necessity for all mobile stations within a paging group to monitor a paging message periodically or continuously.

If these two identifiers are not matched, the paging controller delivers a paging message to all base stations within a paging group. This is because the non-matching of the two identifiers indicates that the mobile station has moved away into a cell area of the target base station.

According to one embodiment of the present invention, a location update is performed only if a mobile station initially moves between cell areas. The location update is not then performed at all. Therefore, if a mobile station does not move away into another cell area, a paging controller sends a paging message to a serving base station only. If a mobile station moves away into another cell area, a paging controller is able to send a paging message to all base stations within a paging group.

Figure 4:
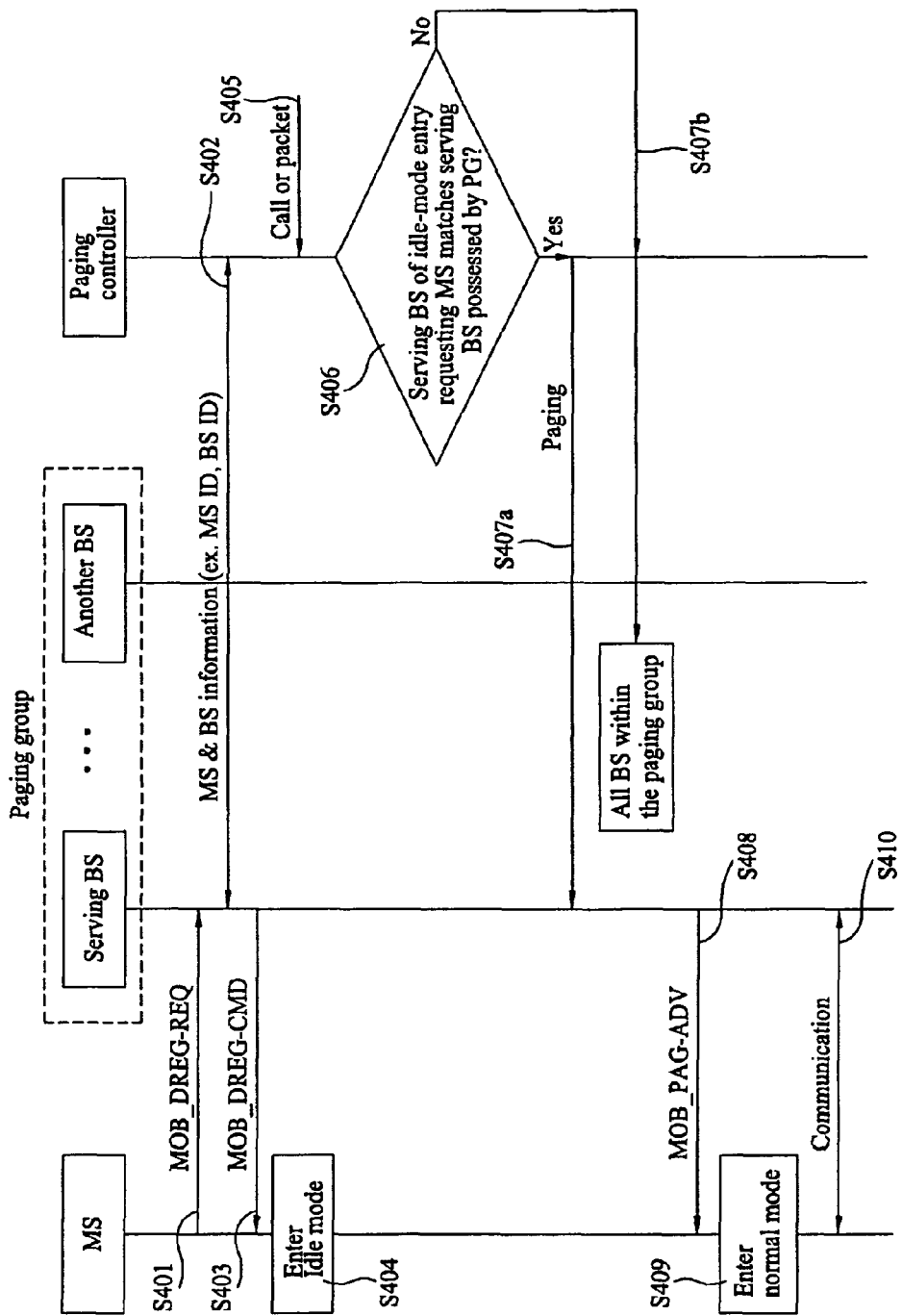
FIG. 4 is a diagram for a paging method according to one embodiment of the present invention, in which an idle-mode mobile station uses a location update in a cell area of a serving base station.

FIG. 4 is a diagram for a paging method using a location update according to one embodiment of the present invention, in which an idle-mode mobile station does not move away into another cell area.

Referring to FIG. 4, a mobile station sends a deregistration request (MOB-DREG-REQ) message to a serving base station to enter an idle mode from a normal mode [S401].

Having received the deregistration request message, the serving base station is able to exchange mobile station information and serving base station information with a paging controller. Namely, the serving base station is able to inform the paging controller of a mobile station identifier of the mobile station entering the idle mode and a serving base station identifier. And, the paging controller is able to inform the serving base station of a paging group identifier (PG ID) or a paging controller identifier (PC ID). In this case, the paging group identifier (PG ID) or the paging controller identifier (PC ID) is usable in transmitting/receiving a paging message [S402].

The serving base station is able to send a deregistration command (MOB_DREG-CMD) message to the mobile station in response to the deregistration request message. In this case, the deregistration command message can contain paging information (e.g., a paging cycle, a paging offset and a paging listening interval). And, the mobile station is able to know whether there is a paging message for the mobile station based on paging information (e.g., a paging indicator, a paging message scheduling information, etc.) contained in a superframe header [S403].

Having checked the MOB_DREG-CMD message, the mobile station enters the idle mode. The mobile station is able to receive a paging message based the paging information received via the MOB_DREG-CMD message and the superframe header. In particular, the mobile station checks whether there is a paging message delivered to the mobile station and is then able to monitor a channel for carrying a paging message in a downlink frame indicated by the superframe header. And, the mobile station operates in sleep mode or 'radio turn off' for the rest of time to reduce a battery consumption [S404].

If a call or a packet to be delivered to the mobile station occurs [S405], the paging controller is able to compare a serving base station identifier (i.e., a first identifier) transmitted at the time of the entry of the mobile station into the idle mode from the mobile station to another serving base station identifier (i.e., second identifier) possessed by the paging controller with each other [S406].

In the step S406, the paging controller is able to trigger a paging procedure according to Formula 1.

MathF*igure* 1
[Math.1]

If (serving BS ID when MS in idle mode==The Serving BS ID where Paging Controller has)

Then, Paging Controller sends paging message only to the Serving BS where the MS is registered. Otherwise, Paging Controller sends paging message to all the BS within paging group.

If the first identifier and the second identifier are identical to each other in the step S406, the paging controller is able to send a paging message to the serving base station indicated by the first identifier only. Therefore, as all mobile stations within the corresponding paging group doesnt need to monitor the paging message all the time, it is able to use a power of the mobile station efficiently [S407*a*].

If the first identifier and the second identifier are not identical to each other in the step S406, although the mobile station has moved away from the cell area in case of its entry into the idle mode, the paging controller is unable to know a prescribed base station to which the mobile station belongs. Hence, the paging controller sends the paging message to all base stations belonging to the corresponding paging group [S407*b*].

If the serving base station receives the paging message from the paging controller, the serving base station sends MOB_PAG-ADV message to mobile stations included in its cell area [S408].

The mobile station receives the MOB_PAG-ADV message from the serving base station, checks that the received message is the paging delivered to itself, and is then able to perform communication with the corresponding base station by entering a normal mode [S409, S410].

Figure 5:
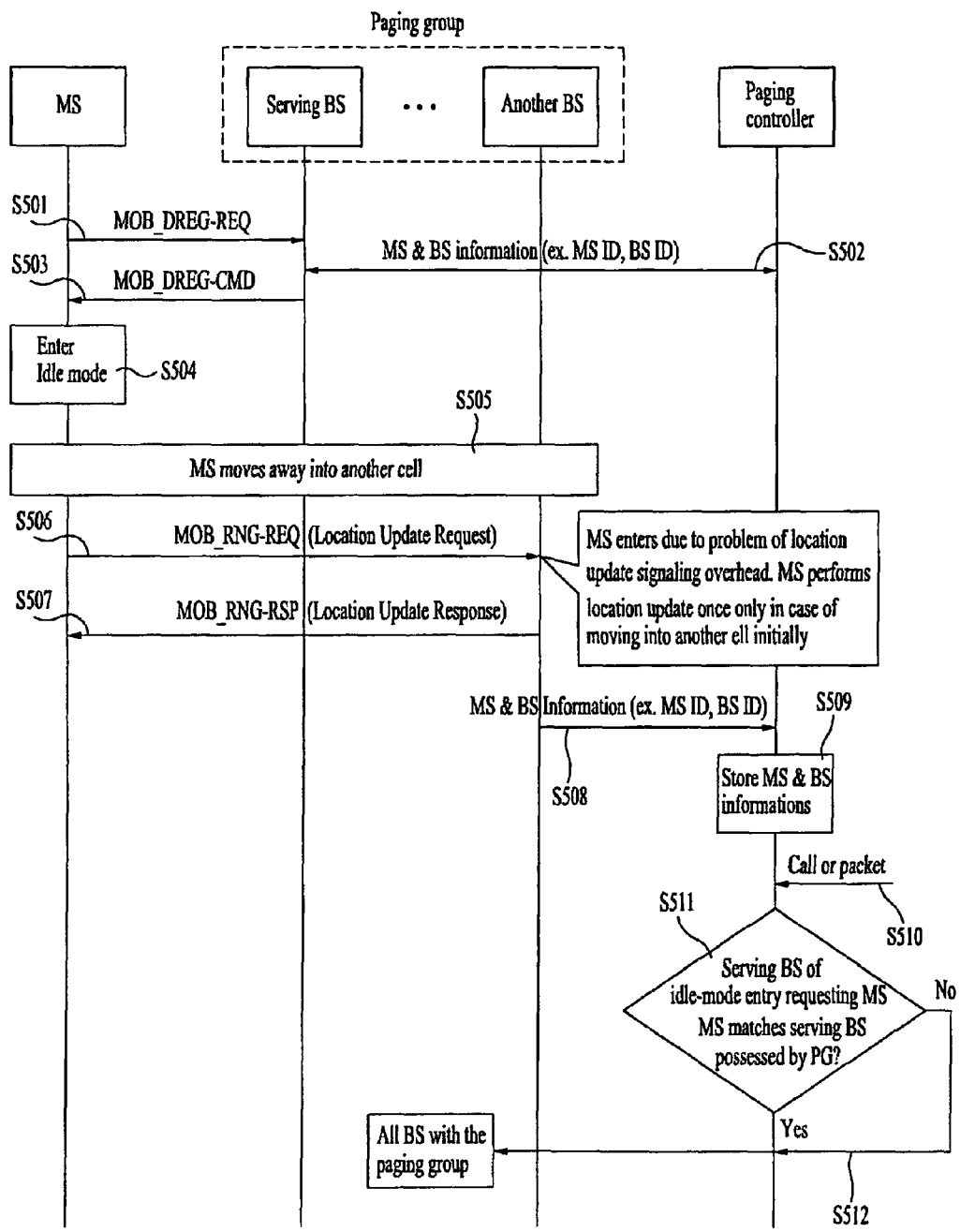
FIG. 5 is a diagram for a paging method according to one embodiment of the present invention, in which an idle-mode mobile station is moving.

FIG. 5 is a diagram for a paging method using a location update according to one embodiment of the present invention, in which an idle-mode mobile station moves away into another cell area.

As steps S501 to S504 are similar to the former steps S401 to S404 in FIG. 4, the following description can refer to FIG. 4.

Referring to FIG. 5, a mobile station enters an idle mode and is then able to move away into another cell area in a multi-cell environment [S505].

According to one embodiment of the present invention, when a mobile station moves away from an original cell area into cell areas different from the original cell area, the mobile station performs a location update procedure in an initially different cell area only. Namely, the mobile station performs a location update only if moving into a different cell area initially. Thereafter, the mobile station may not perform a location update in case of moving away into another different cell area again. This is to reduce signaling overhead that may occur in case of performing the location update each time moving away into another cell.

The mobile station is able to perform the location update procedure in a manner of transmitting MOB_RNG-REQ to a target cell, into which the mobile station has moved in, and then receiving MOB_RNG-RSP [S506, S507].

Before or after the location update procedure, a target base station is able to deliver mobile station information and target base station information (e.g., MS ID and target BS ID) to a paging controller [S508].

The paging controller stores the mobile station information and the target base station information received from the target base station [S509].

An incoming packet may occur in the paging controller or it may necessary to page the mobile station [S510].

In this case, the paging controller determines whether to send a paging message only to a base station at which the mobile station has registered according to the triggering condition of the Math FIG. 1 using the mobile station information and the base station information stored in the step S509 or to all base stations within a paging group [S511].

If serving base station information of the mobile station having made a request for an idle mode entry matches the base station information stored by the paging controller, a paging message is sent to the base station stored in the paging controller. Otherwise, it is able to send a paging message to all base stations within a paging group.

Namely, according to the present embodiment, information of a serving base station, which is the information at the time a mobile station initially enters an idle mode, is a non-variable value. Yet, if a location update is performed as a mobile station moves away from one cell into another cell, base station information stored in a paging controller is changeable by being updated.

If the mobile station does not deviate from a cell, in which the mobile station has entered the idle mode, the base station information stored in the paging controller will match information of a serving base station into which the mobile station in idle mode has moved. Hence, the paging controller sends a paging message to the serving station into which the mobile station in idle mode has moved.

On the contrary, if the mobile station moves away from the serving base station into which the mobile station in idle mode has moved, the mobile station will perform a location update. Accordingly, the base station information stored in the paging controller becomes different from the serving base station information in case of the idle mode entry. Hence, the paging controller sends a paging message to all base stations within a paging group.

2. Paging Method Using Small Paging Group

According to another embodiment of the present invention, a small paging group (hereinafter abbreviated SPG) is newly defined. The small paging group can mean a paging group smaller than a generally used paging group in size.

And, a large paging group (hereinafter abbreviated LPG) having an area greater than that of a conventional paging group is newly defined and at least one SPG can be included in this large paging group. In this case, of course, a size of the SPG may be equal to or smaller than that of a general paging group. And, the size of the SPG may vary according to user requirements or a channel status.

According to another embodiment of the present invention, if a mobile station exists within a specific SPG, it is able to reduce power consumptions of mobile stations of another SPG in a manner that a paging controller sends a paging message to a base station within the specific SPG only. If a mobile station does not exist in a prescribed SPG, it is able to send a paging message to all base stations included in a large paging group (LPG).

According to another embodiment of the present invention, two paging group identifiers (e.g., LPG ID and SPG ID) are defined. Hence, a specific SPG ID and a specific LPG ID are provided to every mobile station and are usable for a paging controller to deliver a paging message. And, the mobile station is able to check the SPG ID and the LPG ID through a broadcast channel (BCH) of a superframe header.

According to another embodiment of the present invention, when a mobile station moves in a cell area of a base station, a location update is not performed but is performed only if an SPG is changed. If a location update is performed each time a mobile station moves away into another SPG, it may happen that a location update signaling overhead is generated.

Therefore, according to another embodiment of the present invention, a mobile station sets a prescribed small paging group change counter (SPG change counter) and is then able perform location update(s) amounting to a maximum number (n) instead of performing a location update each time moving into SPG. Namely, if a mobile station moves away into other SPGs up to maximum n times, a paging controller is able to send a paging message to all base stations not within a specific SPG but within an LPG.

Figure 6:
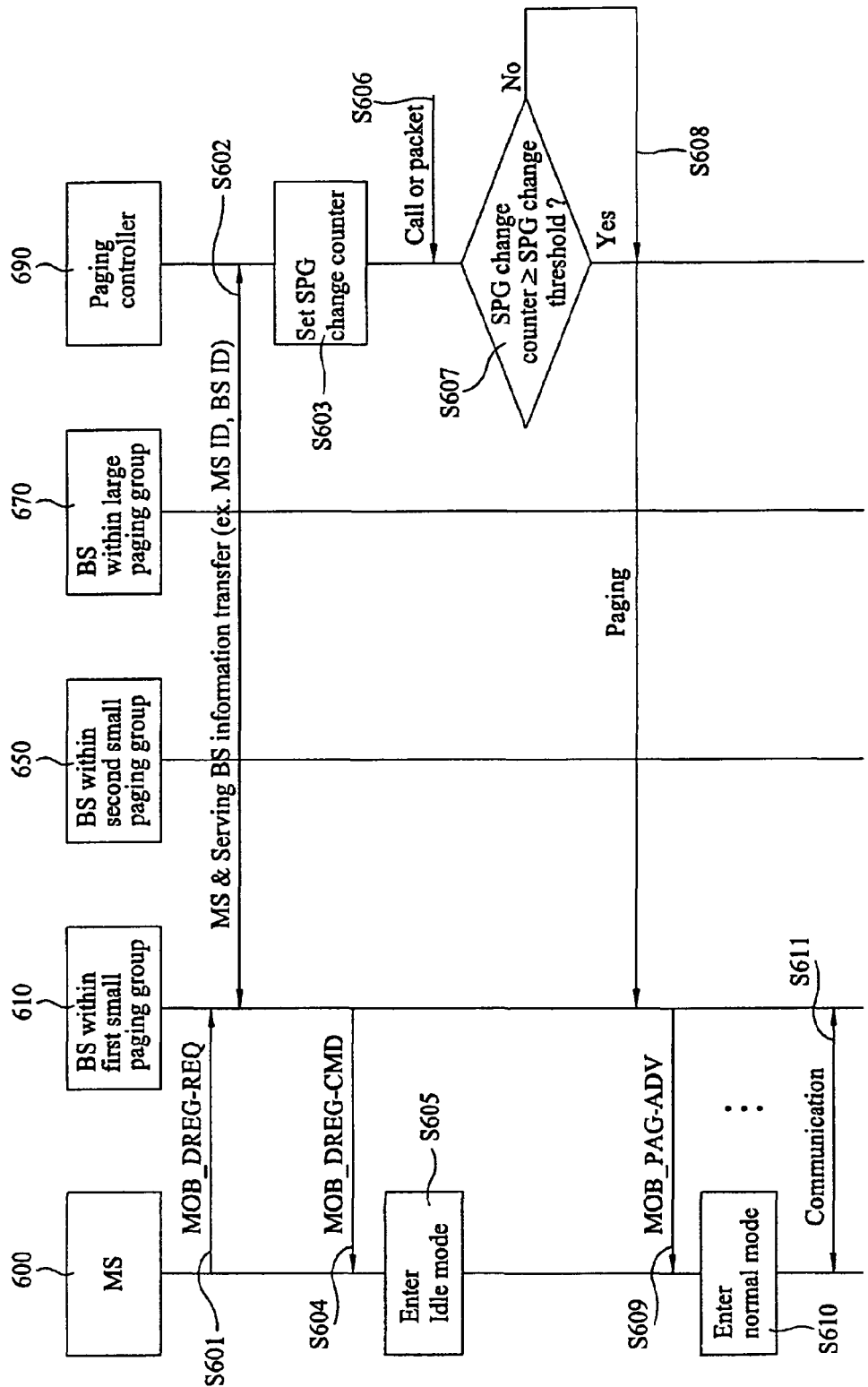
FIG. 6 is a diagram for a paging method according to another embodiment of the present invention, in which a mobile station does not move away from a small paging group.

FIG. 6 is a diagram for a paging method according to another embodiment of the present invention, in which a mobile station does not move away from a small paging group.

Referring to FIG. 6, a network system can include a mobile station (MS) 600, a base station (BS) 610 within a first small paging group, a base station (BS) 650 within a second small paging group, a base station (BS) 670 within a large paging group, and a paging controller 690.

In this case, at least one small paging group (SPG) can be included in the large paging group (LPG). Moreover, assume that the paging controller is provided with an LPG range, an SPG range and basic information on a base station belonging to each group.

Steps S601 to S605 in FIG. 6 are similar to the former steps S401 to S405 in FIG. 4. Yet, in FIG. 6, the serving base station 610 is a base station belonging to a first SPG and information transmitted to the paging controller from the serving base station 610 includes mobile station information and information of the base station 610 belonging to the first SPG.

In FIG. 6, the mobile station (MS) makes a request for an entry into an idle mode by sending MOB_DREG-REQ message to the base station 610 belonging to the first SPG [S601].

The base station 610 belonging to the first SPG is able to transmit information of the mobile station and the base station 610 to the paging controller 690 via a backbone network. And, the paging controller is able to transmit a paging identifier (e.g., SPG ID and LPG ID) to the base station 610 via the backbone network [S602].

The paging controller 609 is able to set up an SPG change counter after the step S602. In this case, the SPG change counter is able to calculate how many times the mobile station 600 has moved into SPGs [S603].

The base station 610 grants the entry into the idle mode by sending MOB_DREG-CMD message. In this case, the MOB_DREG-CMD message is able to further include a paging information field. And, the paging information field is able to include information on SPG ID and LPG ID [S604].

Having received the MOB_DREG-CMD message, the mobile station (MS) enters the idle mode and is then able to minimize its power consumption [S605].

Besides, according to embodiments of the present invention, a paging information field can be included in a superframe header or a ranging response message (RNG-RSP) as well as a deregistration command message (DREG-CMD).

Table 1 shows an example for paging information field format.

TABLE 1

| Parameter name | length | Value | Scope |
|---|---|---|---|
| Paging information | D | 1. PAGING_CYCLE-cycle in which the paging message is transmitted within the paging group.2. PAGING_OFFSET-determines the frame within the cycle in which the paging message is transmitted. Must be smaller than PAGING_CYCLE value.3. Large Paging-group-ID-ID of the large paging group the MS is assigned to.4. Small Paging-group-ID-ID of the small paging group the MS is assigned to. | RNG-RS PDREG-CMD |

Referring to Table 1, a paging information field is able to include a paging cycle, a paging offset, a large paging group (LPG) ID and a small paging group (SPG) ID.

In this case, the paging cycle indicates a cycle for sending a paging message in a paging group and the paging offset determines a frame in which a paging message is sent. The LPG ID indicates an identifier of LPG in which a mobile station is included and the SPG ID indicates an identifier of SPG in which a mobile station is included.

Referring now to FIG. 6, if a call or packet is generated in the step S605, the paging controller 690 checks an SPG change counter value (n) [S606]. If the checked value does not reach a maximum value (MAX N), the paging controller 690 sends a paging message to base stations within an SPG to which the mobile station belongs [S607].

FIG. 6 shows a case that the mobile station does not move away into another SPG. Hence, the SPG change counter value (n) corresponds to 0. Each time SPG is changed, the mobile station performs a location update and the paging controller is able to increment the SPG change counter by 1 (Alternatively, the counter value can be decremented as well). If the mobile station enters a normal mode from an idle mode, the SPG change counter value is reset to 0.

Having received the paging message in the step S607, the serving base station 610 forwards the paging message by broadcasting MOB_PAG-ADV message to mobile stations included in its cell area [S608].

In case of receiving the MOB_PAG-ADV message, the mobile station 600 checks that there is the paging message forwarded to itself and is then able to enter the normal mode [S609].

Moreover, the mobile station 600 and the serving base station 610 are able to perform communication with each other in the normal mode [S610].

Figure 7:
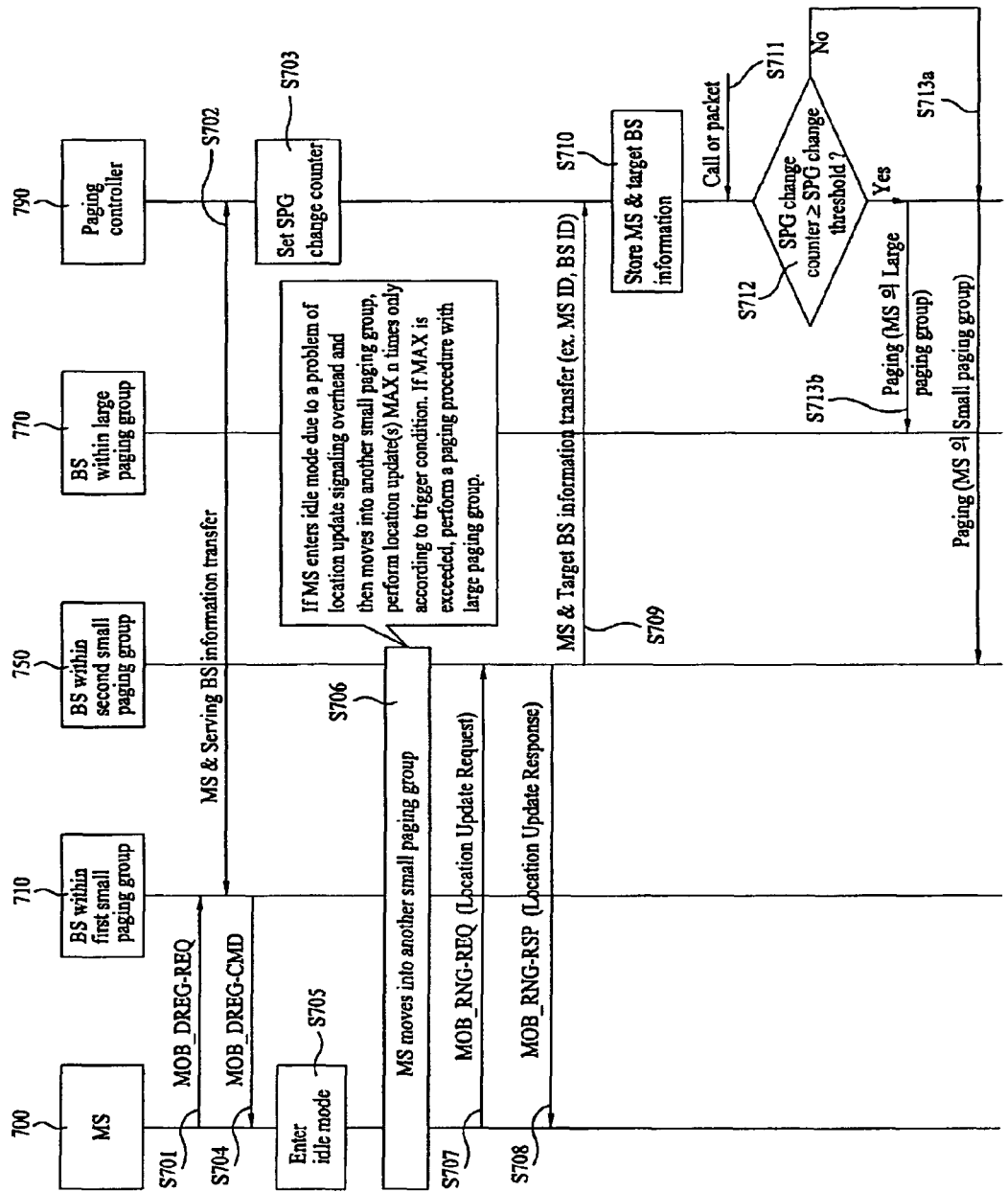
FIG. 7 is a diagram for a paging method according to another embodiment of the present invention, in which a mobile station moves away from a small paging group.

FIG. 7 is a diagram for a paging method according to another embodiment of the present invention, in which a mobile station moves away from a small paging group.

Basic assumption of FIG. 7 is identical to that of FIG. 6. Yet, FIG. 7 differs from FIG. 6 in that a mobile station 700 has moved away into another SPG. Hence, steps S701 to S705 in FIG. 7 can refer to the former steps S601 to S605.

In a fast multi-cell environment, a mobile station is able to move away into another SPG area. Although an initial SPG area movement is shown in FIG. 7, it is able to represent a plurality of SPG area movements [S706].

If the mobile station 700 moves away into a different SPG, the mobile station 700 makes a request for a location update by sending MOB_RNG-REQ to a target base station 750 of the different SPG [S707].

The target base station 750 makes a response to the location update request by sending MOB_RNG-RSP to the mobile station 700 [S708].

In the procedure of the location update, the target base station 750 delivers information of the mobile station 700 and target base station information (e.g., MS ID and target BS ID) to the paging controller [S709].

The paging controller 790 is able to receive the MS information and the target base station information 750 from the base station 750 within a second SPG. In this case, the paging controller 790 is able to calculate the number of SPG area movements of the MS by incrementing or decrementing an SPG change counter value by 1 each time that MS 700 performs a location update. Moreover, the paging controller 790 stores the MS information and the target base station information and is able to use the information in sending a paging message [S710].

If a call or packet is generated to be delivered to the mobile station [S711], the paging controller 790 checks the SPG change counter value [S712].

In the step S712, the paging controller is able to trigger paging according to MathFigure 2.

MathF*igure* 2
[Math.2]

If (Small Paging Group Change Count=Maximum value)
Then, Paging Controller sends paging message to all BS within large paging group. Otherwise, Paging Controller sends paging message only to all BS within own small paging group.

In the step S712, if the SPG change counter value (n) fails to reach a maximum value (or, a minimum value in case of decrementing the counter), the paging controller checks an SPG ID of a current mobile station and then sends a paging message to the corresponding SPG.

The paging controller is able to extract the SPG ID using the mobile station information and the target base station information received in the step S709 [S713*a*].

If the SPG change counter value (n) reaches a maximum value (MAX N) (Counter n==Maximum N), the paging controller is able to send a paging message to all base stations included not in a specific SPG but in an LPG [S713*b*].

If the SPG change counter value (n) reaches a maximum value (N), the mobile station 700 does not perform the location update any further despite moving away into another SPG. Moreover, in case that the mobile station 700 moves away into another LPG or an SPG within another LPG, it is able to reset the SPG change counter value (n) to '0'.

According to embodiments of the present invention, a mobile station, a base station and/or a paging controller is able to include an SPG change counter. FIG. 6 and FIG. 7 describe a paging group changing process with reference to an SPG change counter of a paging controller. Of course, if an SPG change counter value meets the condition for changing a paging group in a mobile station or a base station, the mobile station or the base station is able to attempt to change the paging group.

Figure 8:
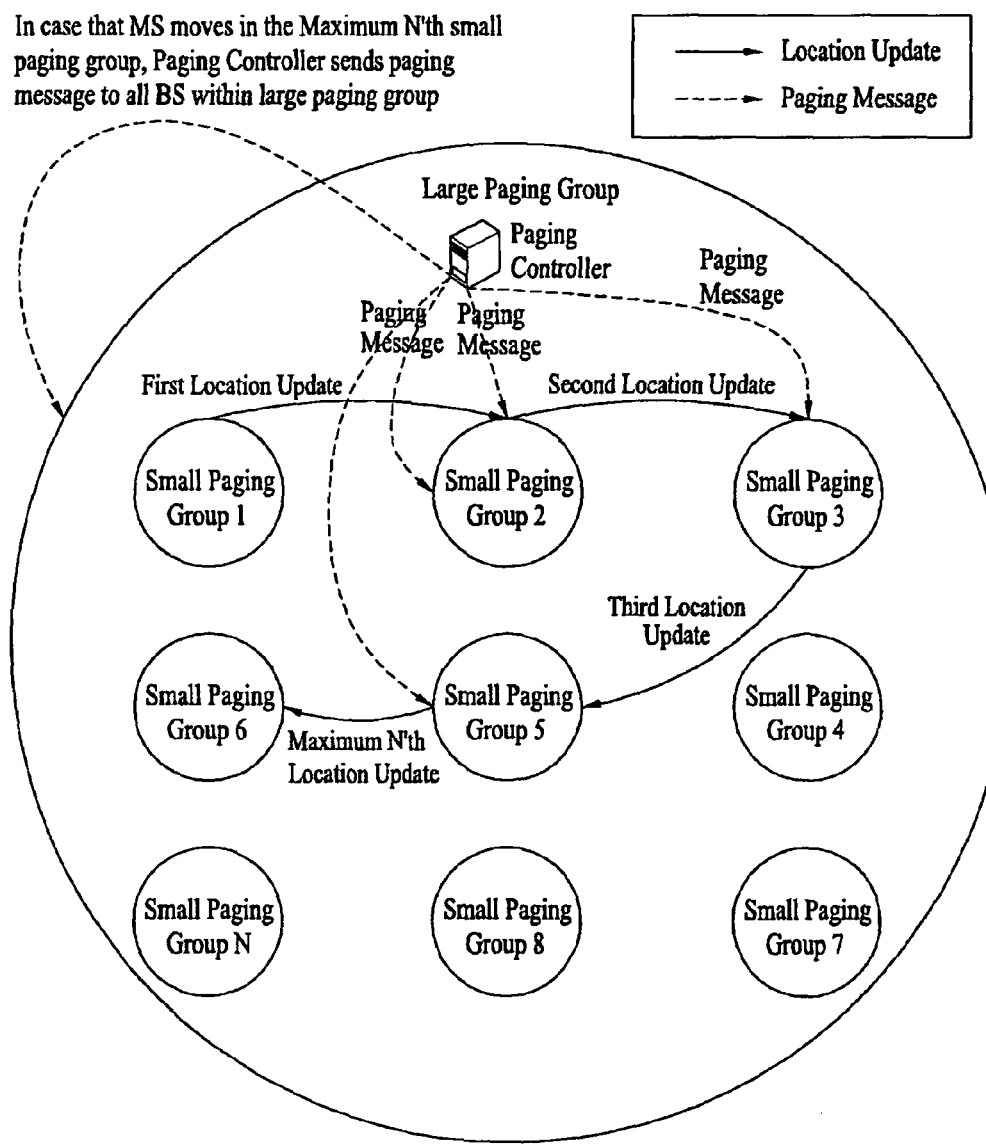
FIG. 8 is a diagram for a regional concept of a large paging group and small paging groups according to another embodiment of the present invention.

FIG. 8 is a diagram for a regional concept of a large paging group and small paging groups.

Referring to FIG. 8, it is able to obtain a regional location relation between a large paging group (LPG) and a small paging group (SPG). The LPG includes at least one SPG. And, one paging controller can be located at one LPG. In this case, if a call or packet for a specific mobile station occurs, the paging controller is able to send a paging message to the LPG or the SPG.

Moreover, in FIG. 8, the mobile station performs a location update in case of moving into a new SPG and the paging controller is able to calculate the number of location updates of the mobile station. In case that a call or packet occurs in the paging controller, the paging controller checks an SPG ID of the mobile station and is then able to send a paging message to the corresponding SPG. Yet, according to another embodiment of the present invention, it is able to limit the location update number of the mobile station up to maximum N times to reduce signaling overhead. Therefore, the mobile controller is able to send a paging message to all base stations included not in a specific SPG but in an LPG after the mobile station has moved into SPG areas maximum N times.

3. Paging Group Changing Method

A further embodiment of the present invention relates to a paging group changing method. As a method of changing a paging group, there is a method of changing a small paging group (SPG) into a large paging group (LPG) or a method of changing a large paging group (LPG) into a small paging group (SPG).

The method of changing SPG into LPG is explained as follows.

First of all, a paging method using SPG and LPG according to embodiments of the present invention is enabled in a manner that a mobile station (MS) performs a location update on a network to inform a paging controller of a location of the MS. Yet, in case of a mobile station (MS) that is moving at high speed, it is highly probable that the mobile station frequently moves between SPGs. Hence, a signaling overhead may increase due to many location updates attributed to the high probability.

Therefore, according to a further embodiment of the present invention, if a mobile station at high speed performs location updates over an SPG change counter threshold during a prescribed SPG change timer time, a method of changing a paging group, to which the mobile station (MS) belongs, from a specific SPG into an LPG is disclosed.

In case that a mobile station (MS) moves different SPGs over a threshold (N) during an SPG change timer time, it is able to make a request for a change of a paging group into an LPG to a network (base station and paging controller). According to a further embodiment of the present invention, a mobile station (MS) determines a change of a paging group and is then able to perform a location update.

Figure 9:
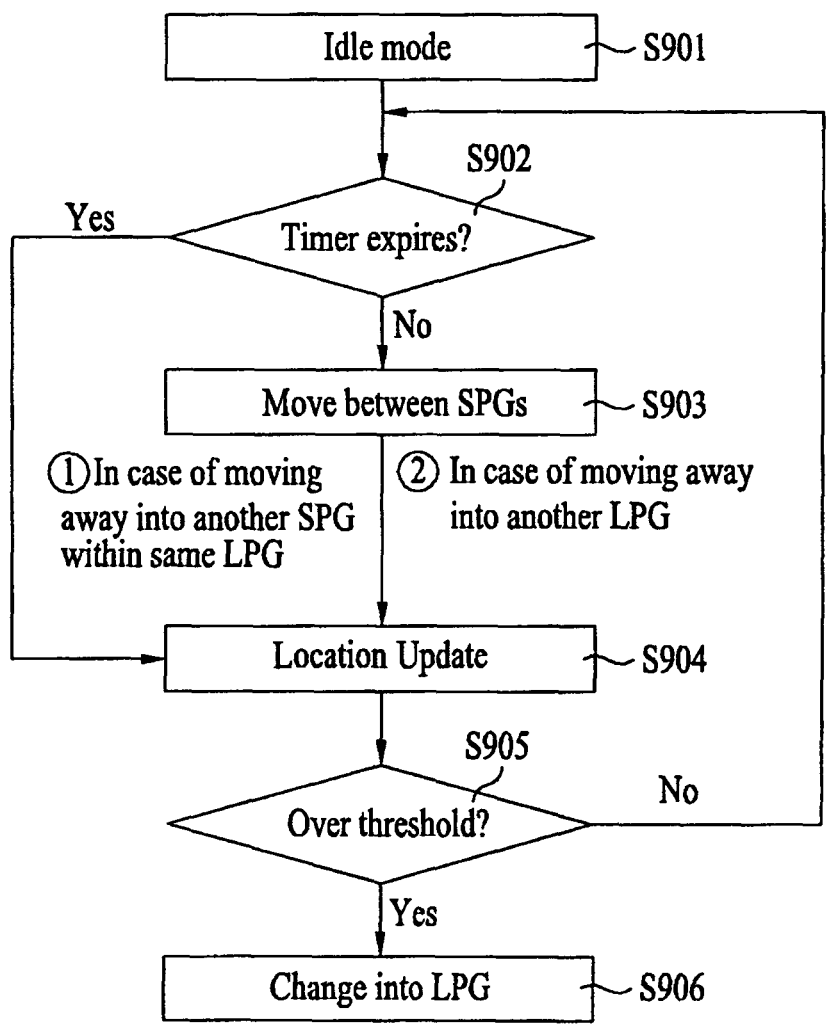
FIG. 9 is a flowchart of a process for changing a paging group in a mobile station according to a further embodiment the present invention.

FIG. 9 is a flowchart of a process for changing a paging group in a mobile station according to a further embodiment the present invention.

Referring to FIG. 9, a mobile station in an idle mode is able to move in a multi-cell area [S901].

After the mobile station has entered the idle mode, it is able to set up an SPG change timer. Therefore, the mobile station is able to perform different operation according to whether the SPG change timer expires [S902].

If the SPG change timer expires in the step S902, the mobile station is able to perform a location update with a base station of an SPG the mobile station currently belongs to.

While the SPG change timer does not expire in the step S902, the mobile station is able to move in the multi-cell area. In doing so, the mobile station is able to move away from a current SPG area into a different SPG area [S903].

In doing so, the mobile station is able to perform a location update with a base station of the different SPG area [S904].

In the step S904, the mobile station performs the location update in two cases as follows.

First of all, the mobile station is able to perform a location update in case of moving away into a different SPG area within the same LPG.

Secondly, the mobile station is able to perform a location update in case of moving away from a current LPG area into a different LPG area or moving away from an SPG of a current LPG area into an SPG area of a different LPG area.

The mobile station is able to calculate an SPG change counter each time performing a location update [S905].

In the step S905, if a value (n) of the SPG change counter does not exceed a prescribed threshold (N), a routine goes back to the step S902 to check whether the SPG change timer expires. If the SPG change counter fails to expire, the steps S903 to S905 can be repeated up to a threshold of the SPG change counter.

In the step S905, if a value (n) of the SPG change counter exceeds a prescribed threshold (N), the mobile station does not perform a location update any more but is able to attempt a change of a paging group. Namely, in case that the mobile station moves between SPGs as many as maximum N times, the mobile station changes SPG into LPG and does not perform a location update any more. Through the operation shown in FIG. 9, the mobile station is able to reduce a location update overhead attributed to the frequent location updates.

According to embodiments of the present invention, a mobile station, a base station and/or a paging controller is able to include an SPG change counter. FIG. 9 is provided to describe a paging group changing process with reference to the SPG change counter included in the mobile station. If a value of an SPG change counter in the base station or the paging controller meets a condition for changing a paging group, the base station or the paging controller is able to attempt a change of a paging group of the mobile station as well.

A method of changing an LPG into an SPG according to a further embodiment of the present invention is explained as follows.

According to embodiments of the present invention disclose a method of operating a paging group using SPG and LPG. According to embodiments of the present invention, a mobile station changes a paging group into an LPG by moving between SPGs amounting to a prescribed count of times. After sufficient duration, a considerable number of mobile stations belonging to SPG change a paging group into LPG, whereby the number of mobile stations belonging to the LPG may increase. This may work as overhead in viewpoints of both mobile station (MS) and base station.

Namely, in viewpoint of the mobile station, despite that a paging controller does not page the corresponding mobile station, there is a problem a power may be unnecessarily consumed in order for the mobile station to check whether there is a paging message delivered to the corresponding mobile station. Moreover, in viewpoint of the base station, there is a problem that a size of a paging message supposed to be delivered to the mobile station is increased.

To solve theses problems, one method is proposed as follows.

First of all, according to a further embodiment of the present invention, if a mobile station belonging to an LPG does not change a base station not to exceed a threshold for a specific time, the mobile station or a paging controller can determine that mobility of the mobile station is low. Therefore, the mobile station or the paging controller enables a paging group, to which the mobile station belongs, to be changed into an SPG from the LPG. After the paging group has been changed, the mobile station is able to perform a location update again.

Secondly, to solve the above problems, another method is proposed as follows.

First of all, a mobile station (MS) is able to set an LPG timer in case of changing an SPG into an LPG. If the LPG timer expires, the mobile station determines that its mobility is low and is then able to change a paging group into a specific SPG from the LPG. Of course, a paging controller may operate an LPG timer. If the LPG timer expires, the paging controller determines that mobility of a mobile station is low and is then able to indicate a change (from LPG to SPG) of a paging group.

FIG. 10 is a diagram for a location updating method applicable for embodiments of the present invention.

In (a) of FIG. 10, shown is a location update method according to the embodiments of the present invention.

Referring to (a) of FIG. 10, in case that a mobile station moves away into a different paging group, the mobile station is able to make a request for a location update by sending MOB_RNG-REQ message to a target base station (or, a paging controller) [S1001].

In response to this message, the target base station is able to complete the location update by sending MOB_RNG-RSP message including a changed paging group identifier. In this case, the MOB_RNG-RSP message can further include a location update success indication parameter [S1002].

In (b) of FIG. 10, shown is a location update method according to a further embodiment of the present invention. According to embodiments of the present invention, a mobile station may operate an SPG change timer and an SPG change counter or an LPG timer. Therefore, if a prescribed condition is met, the mobile station determines a change of a paging group and is then make a request for the change of the paging group [S1010].

For instance, if an SPG change timer and an SPG change counter operated by a mobile station meet prescribed requirements, the mobile station is able to make a request for a change of SPG into LPG to a target base station (or, a paging controller). Moreover, if an LPG timer operated by a mobile station expires, the mobile station is able to make a request for a change of LPG into SPG [S1020].

In response to the request, the target base station is able to complete a location update by sending MOB_RNG-RSP message including a changed paging group identifier. In this case, the MOB_RNG-RSP message can further include a location update success indication parameter [S1030].

It is able to consider a method of supporting a paging of an idle-mode mobile station by combining the above-described embodiments of the present invention.

For instance, the method described with reference to FIG. 4 and FIG. 5 and the method described with reference to FIG.

6 and FIG. 7 can be combined with each other. In particular, despite using the SPG and LPG concept, a location update can be performed only if an initial SPG area is changed. Therefore, a paging controller sends a paging message to a base station included in an initial SPG only. If an SPG area is changed, the paging controller is able to send a paging message to all base stations included in an LPG.

Furthermore, it is able to provide a new embodiment by combining the features and steps described with the reset of the accompanying drawings.

According to a still further embodiment of the present invention, a mobile station and a base station (FBS, MBS) are explained as a transmitting side or a receiving side for performing the above-described embodiments of the present invention.

First of all, a mobile station works as a transmitter in uplink and is able to work as a receiver in downlink. A base station works as a receiver in uplink and is able to work as a transmitter in downlink. In particular, each of the mobile station and the base station includes a transmitter and a receiver for transmission of information and/or data.

Each of the transmitter and the receiver can include a processor, a module, a part and/pr a means for performing embodiments of the present invention. In particular, each of the transmitter and the receiver can include a module (means) for encrypting a message, a module for interpreting the encrypted message, an antenna for transceiving the message and the like.

A terminal used for embodiments of the present invention can include a low-power RF/IF (radio frequency/intermediate frequency) module. And, the terminal can include means, modules, parts and/or the like for performing a controller function for performing the above-described embodiments of the present invention, a MAC (medium access control) frame variable control function according to a service characteristic and electric wave environment, a handover function, an authentication and encryption function, a packet modulation/demodulation function for data transmission, a fast packet channel coding function, a real-time modem control function, and the like.

A base station is able to transmit data received from an upper layer to a terminal. The base station can include a low-power RF/IF (radio frequency/intermediate frequency) module. And, the base station can include means, modules, parts and/or the like for performing a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function, and the like.

Accordingly, the present invention is applicable to various wireless access systems. And, 3GPP ($3^{rd}$ generation partnership project), 3 GPP2 and/or IEEE 802.xx (institute of electrical and electronic engineers 802) system and the like are examples for the various wireless access systems. Embodiments of the present invention are applicable to all technical fields having the various wireless access systems applied thereto as well as the various wireless access systems.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method of paging a mobile station in idle mode by a paging controller, the method comprising:
   receiving a message including an identifier of a large paging group having a plurality of small paging groups and an identifier of a first small paging group among the plurality of small paging groups, the mobile station being assigned to both of the large paging group and the first small paging group;
   if the mobile station moves away from the first small paging group into a second small paging group among the plurality of small paging groups, performing a location update by a small paging group unit with a target base station within the second small paging group, the location update by the small paging group unit being performed only if the movement from the first small paging group to the second small paging group is an initial movement in the idle mode; and
   transmitting a paging message to at least one base station of the large paging group,
   wherein the transmitting the paging message to the base station comprises:
   transmitting the paging message only to base stations of the first small paging group, if the location update has not been performed; and
   transmitting the paging message to all the base stations of the large paging group, if the location update has been performed.

2. The method of claim 1, further comprising if the mobile station enters the idle mode, setting a small paging group change timer.

3. The method of claim 2, wherein if the small paging group change timer expires, the location update is performed with a target base station of the small paging group to which the mobile station belongs on the expiration of the timer.

4. The method of claim 2, further comprising setting a small paging group change counter having a maximum threshold.

5. The method of claim 4, wherein if the small paging group change counter exceeds the maximum threshold, the mobile station changes a paging group into the large paging group.

6. The method of claim 5, further comprising making a request for a change into the large paging group from the small paging group the mobile station belongs to.

7. The method of claim 4, further comprising:
   receiving a backbone message including information of a target base station belonging to the second small paging group into which the mobile station has moved,
   wherein the paging controller calculates a value of the small paging group change counter by considering the information included in the backbone message.

8. The method of claim 7, further comprising:
   if the value of the small paging group change counter corresponds to the threshold, sending a message for indicating a paging group change into the large paging group to the mobile station.

9. A method of performing a location update by a mobile station (MS) in a wireless communication system, the method comprising:

receiving, from a base station (BS), identifiers of a plurality of paging groups, the MS being assigned to the plurality of paging groups;

starting a timer when the MS leaves a first paging group among the plurality of paging groups, but stays within a second paging group among the plurality of paging groups;

performing a location update after the timer expires if the MS stays in the second paging group but not in the first paging group;

transmitting information on mobility of the MS for changing at least one of the assigned plurality of paging groups, to the BS after the timer expires; and receiving a message including information on a changed paging group from the BS.

10. The method of claim 9, wherein if the timer has not expired, the MS does not perform the location update when the MS moves within the assigned plurality of paging groups.

\* \* \* \* \*